United States Patent [19]

Jadraque et al.

[11] Patent Number: 6,025,003
[45] Date of Patent: Feb. 15, 2000

[54] PROCESS FOR THE PREPARATION OF AN ICE CONFECTION

[75] Inventors: Jose Antonio Jadraque; Cees Van der Star; Juan Vinallonga, all of Barcelona, Spain; Otto Weibel, Rotterdam, Netherlands

[73] Assignee: Good Humors Breyers Ice Cream, Green Bay, Wis.

[21] Appl. No.: 09/026,219

[22] Filed: Feb. 19, 1998

[30] Foreign Application Priority Data

Feb. 20, 1997 [EP] European Pat. Off. .............. 97200427

[51] Int. Cl.⁷ ...................................................... A23G 1/00
[52] U.S. Cl. ............................................ 426/515; 426/524
[58] Field of Search .................................. 426/515, 524; 62/59, 66, 345

[56] References Cited

U.S. PATENT DOCUMENTS

| | | | |
|---|---|---|---|
| 4,426,402 | 1/1984 | Kaupert | 426/515 |
| 4,548,045 | 10/1985 | Altares et al. | 62/63 |
| 5,359,858 | 11/1994 | Miller et al. | 62/345 |
| 5,409,722 | 4/1995 | Binley | 426/515 |

FOREIGN PATENT DOCUMENTS

| | | |
|---|---|---|
| 578046 | 5/1985 | Australia . |
| 0 582 327 | 2/1994 | European Pat. Off. . |
| 0 589 820 A1 | 3/1994 | European Pat. Off. . |
| 666297 | 2/1952 | United Kingdom . |
| 1128525 | 9/1968 | United Kingdom . |
| 2 135 437A | 8/1984 | United Kingdom . |
| 90/06693 | 6/1990 | WIPO . |
| 94/12046 | 6/1994 | WIPO . |
| 96/24261 | 8/1996 | WIPO . |

OTHER PUBLICATIONS

European Search Report in the European Patent Application EP 98/301198.

European Search Report in the European Patent Application EP/97 20 0427 dated Aug. 29, 1997.

*Primary Examiner*—George C. Yeung
*Attorney, Agent, or Firm*—James J. Farrell

[57] ABSTRACT

A process for the manufacture of a frozen ice confection within a multi-part or split mold, wherein the mold is pre-cooled to below −50° C., the process comprising the steps of;

(a) exposing the empty mold to a cryogenic liquid;
(b) releasing any cryogenic liquid from the mold;
(c) introducing the ice confection into the mold;
(d) allowing at least the ice confection in contact with the mold to freeze; and
(e) releasing the frozen ice confection from the mold.

5 Claims, No Drawings

PROCESS FOR THE PREPARATION OF AN ICE CONFECTION

TECHNICAL FIELD OF THE INVENTION

The invention relates to a process for the preparation of an ice confectionary product, wherein the process involves the use of a mould.

BACKGROUND TO THE INVENTION

EP 582 327 discloses a method for freezing aqueous liquids, wherein the liquid is introduced into a pro-cooled single part mould such that the aqueous liquid once frozen can be readily released from the mould as a unitary structure.

It is desirable to be able to make ice confectionary products which are of increasingly complex shapes, such as spheres, fruit shapes. In order to manufacture such products a mould is required which comprises greater than one part. However, we have found that when the process disclosed in EP 582 327 is used to manufacture a frozen ice confection product in a multi-part or split mould a number of problems are encountered with the release of the product.

In particular when used within a continuous process an ice layer forms between the sections of the multi-part or split mould making it difficult to both adequately close the mould prior to dosing the product to be shaped and frozen and also to open the mould in order to readily release the product.

Surprisingly we have found that if the empty mould is exposed to a cryogenic liquid before dosing the liquid to be frozen, an ice layer no longer forms at the interface between the mould parts and the mould can both be adequately closed and the product can be readily released at the end of the process.

DISCLOSURE OF THE INVENTION

Accordingly the invention provides a process for the manufacture of a frozen ice confection within a multi-part or split mould, wherein the mould is pre-cooled to a temperature below −50° C., said process comprising the steps of;

(a) exposing the empty mould to a cryogenic liquid;
(b) releasing any cryogenic liquid from the mould;
(c) introducing the ice confection into the mould;
(d) allowing at least the ice confection in contact with the mould to freeze; and
(e) releasing the frozen ice confection from the mould.

In order to expose the empty mould to the cryogenic liquid the empty mould is preferably immersed in the cryogenic liquid. Alternatively the empty mould may be exposed to the cryogenic liquid by spraying the cryogenic liquid onto the surface of the mould. The empty mould may be exposed to the cryogenic liquid either whilst open or closed.

The mould may be partly or totally re-immersed in the cryogenic liquid or sprayed with cryogenic liquid for steps (c) and/or (d), however this is not essential. Further cooling if required may alternatively be provided by means such as a mechanical refrigeration unit.

Preferably the exposure of the empty mould to the cryogenic liquid (step (a)) is conducted for from 10 to 30 seconds.

In a preferred process of the invention, a mould comprising greater than two parts is used to effect easier de-moulding. Most preferred the mould consists of four parts.

The term ice confection is intended to include for example ice cream, frozen yoghurt, water ice, sherbet, chocolate and couverture and products having a combination thereof.

The ice confection may comprise a single component such as ice cream or water ice. Alternatively in order to manufacture a composite product a first composition to be frozen, for example water ice or chocolate, may be dosed into the mould and allowed to freeze only in a layer adjacent to the mould surface. The unfrozen composition in the centre of the product can then be removed and a further composition, for example ice cream, added.

It may be desirable for the freezing process to be such that only the outer surface of the ice confection product (ie the surface in contact with the mould) is frozen whilst the product is retained in the mould, such that the product shape is formed sufficiently to be retained on de-moulding. The product is then de-moulded and frozen throughout by a further freezing step in, for example, a hardening tunnel.

Alternatively, the ice confection maybe retained in the mould until frozen throughout. This latter process will advantageously not require any further freezing steps in, for example, a hardening tunnel.

The moulds may be manufactured from any suitable material. Examples include chrome cobalt, titanium, aluminium or stainless steel.

The cryogenic liquid used will typically be liquid nitrogen.

EXAMPLES

Example 1

A mould made of titanium and consisting of 4 sections was provided in the shape of a lemon having a diameter of from 59 mm to 62 mm and a length of from 100 to 110 mm. The mould was immersed open in liquid nitrogen for 10 seconds. The open mould was then removed from the liquid nitrogen, closed and re-immersed into liquid nitrogen such that the mould was pre-cooled to a temperature below −100° C. Any liquid nitrogen retained in the mould was released.

A water ice solution having the following formulation was prepared;

| Water Ice Solution | % by weight |
| --- | --- |
| Sugars | 31.000 |
| Stabiliser (Locust Bean Gum and gelatin) | 1.050 |
| Lemon Juice | 1.400 |
| Lemon Paste | 0.070 |
| Colours | 0.125 |
| Flavours | 0.010 |
| Water | to 100 |

The water ice solution was slush frozen in a scraped surface heat exchanger to form a water ice slush having a temperature of from −3 to −4° C. prior to dosing into the pre-cooled mould.

The water ice slush was retained in the mould for 10 seconds such that a frozen water ice layer of from 2.5 mm to 3 mm was formed on the inner surface of the mould. The remaining unfrozen water ice slush was then sucked out of the mould and ice cream having the following composition was dosed into the mould;

| Ice Cream Composition | % by weight |
|---|---|
| Skimmed milk powder | 4.00 |
| Whey Powder | 3.45 |
| Sugars | 27.10 |
| Butteroil | 5.20 |
| Flavour | 0.05 |
| Lemon Juice Concentrate | 2.00 |
| Stabiliser/emulsifier | 0.97 |
| Citric acid | 0.50 |
| Colouring | 0.04 |

The mould was then retained in liquid nitrogen for a further 20 seconds in order that the product be frozen throughout. The mould was then opened and a lemon shaped product was readily removed having a water ice "skin" and an ice cream centre.

The product was immediately packaged and stored frozen at approximately −30° C.

This process could be continuously repeated and an excellent shaped product achieved every time with very ready release from the mould, providing that before re-filling the mould with the water ice slush, the empty mould was first immersed in liquid nitrogen to remove any condensation which had accumulated during the previous run.

Example 2

A mould made of chrome cobalt and consisting of 4 sections was provided in the shape of a lemon having an internal diameter of approximately 78 mm, an external diameter of 80 mm, an internal length of approximately 91 mm and an external length of 92 mm. The empty mould was immersed in liquid nitrogen for from 10 to 15 seconds. The mould was then removed from the liquid nitrogen and any liquid nitrogen within the mould was released. The mould was thus provided with a temperature of below −100° C.

A water ice solution having the composition as in Example 1 was slush frozen in a scraped surface heat exchanger to a temperature of −4° C. to provide a water ice slush. The water ice slush was then dosed into the pre-cooled mould and retained in the mould for 15 seconds such that a frozen water ice layer of approximately 5 mm was formed on the inner surface of the mould. The remaining water ice slush was then sucked out of the mould.

Ice cream having the composition as in Example 1 was next dosed into the mould.

The mould was then re-immersed in liquid nitrogen for 10 to 20 seconds. The mould was then removed from the liquid nitrogen, opened and a lemon shaped product was readily removed having a water ice "skin" and an ice cream centre. This product was then packaged and stored at approximately −30° C.

This process could be continuously repeated and an excellent shaped product achieved every time with very ready release from the mould, providing that before re-filling the mould with the water ice slush, the empty mould was first immersed in liquid nitrogen to remove any condensation which had accumulated during the previous run.

Comparative Example A

Example 2 was repeated using the same mould continuously, except that the empty cold mould was not immersed in liquid nitrogen prior to dosing the water ice slush into the mould.

The product provided had noticeable ridges corresponding to the points where the four individual mould parts met, due to the fact that the mould could not be tightly closed. Furthermore it was very difficult to release the product from the mould.

We claim:

1. A process for the manufacture of a frozen ice confection, said process comprising the steps of;
   (a) exposing an empty multi-part or split mould to a cryogenic liquid to pre-cool the mould to a temperature below −50° C.;
   (b) releasing the cryogenic liquid from the mould;
   (c) introducing an ice confection into the mould;
   (d) allowing at least the ice confection in contact with the mould to freeze; and
   (e) releasing the frozen ice confection from the mould.

2. A process according to claim 1 wherein the mould comprises greater than two parts.

3. A process according to claim 1 wherein the mould comprises four parts.

4. A process according to claim 1 wherein the cryogenic liquid is liquid nitrogen.

5. A process according to claim 1 wherein the product is frozen throughout whilst retained in the mould.

* * * * *